Sept. 20, 1960  F. KALWAITES  2,952,893
SPRING BELT CROSS STRETCHING MACHINE
Filed Oct. 31, 1956  5 Sheets-Sheet 1

INVENTOR
FRANK KALWAITES
BY Schneider, Dressler & Goldsmith
ATTORNEYS

INVENTOR
FRANK KALWAITES
BY Schneider, Dressler & Goldsmith
ATTORNEYS

Sept. 20, 1960 F. KALWAITES 2,952,893
SPRING BELT CROSS STRETCHING MACHINE
Filed Oct. 31, 1956 5 Sheets-Sheet 3

INVENTOR
FRANK KALWAITES
BY Schneider, Dressler & Goldsmith
ATTORNEYS

Sept. 20, 1960  F. KALWAITES  2,952,893
SPRING BELT CROSS STRETCHING MACHINE
Filed Oct. 31, 1956  5 Sheets-Sheet 4

INVENTOR
FRANK KALWAITES
BY Schneider, Dressler & Goldsmith
ATTORNEYS

Sept. 20, 1960        F. KALWAITES        2,952,893

SPRING BELT CROSS STRETCHING MACHINE

Filed Oct. 31, 1956        5 Sheets-Sheet 5

INVENTOR
FRANK KALWAITES
BY Schneider, Dressler & Goldsmith
ATTORNEYS

# United States Patent Office 2,952,893
Patented Sept. 20, 1960

2,952,893
SPRING BELT CROSS STRETCHING MACHINE

Frank Kalwaites, Highland Park, N.J., assignor to Chicopee Manufacturing Corporation, a corporation of Massachusetts Filed Oct. 31, 1956, Ser. No. 621,490

17 Claims. (Cl. 28—76)

This invention relates to a machine for transversely stretching and longitudinally shrinking webs of non-woven fibers and particularly to such a machine capable of effecting simultaneous cross-stretching and long-shrinking of a web of non-woven fibers in such a way that the unit web weight remains approximately constant as these two dimensional changes are effected.

Although the machine of the present invention is primarily designed for cross-stretching and long-shrinking of unbonded webs of nonwoven fibers, it can be used to perform these operations on wet prebonded nonwoven webs, dry nonwoven webs and the like.

Nonwoven fabrics are conventionally manufactured at the present time by producing a more or less tenuous web of loosely associated textile fibers disposed in sheet form (using any one of a variety of well-known procedures) and then bonding the sheet or web, to anchor or bond the individual fibers together. The conventional base material for such nonwoven fabrics is a web comprising any of the common textile-length fibers or mixtures thereof. The web may comprise natural fibers, such as cotton, wood, wool, jute, ramie, or abaca, or artificial fibers of viscose rayon, cuprammonium rayon, cellulose acetate, nylon, dynel, or other materials, either alone or in combination with one another. The length of the individual fibers depends upon the ultimate purpose for which the web is intended. Ordinarily the fibers vary from approximately one-fourth to one-third of an inch as the lower limit to approximately two or more inches in staple length.

These fibers are customarily processed into web form by one of two general techniques, i.e., carding or the like to form an "oriented" web, or air-laying to form an "isotropic" web.

"Oriented" webs are made by passing the fibers through a conventional card to form a web or sheet of loosely associated fibers, and then superposing a plurality of these webs to provide a laminated web weighing approximately from 100 to 5000 grains per square yard. This web or sheet of fibers is produced continuously with most of the fibers substantially parallelized or oriented in the "machine direction," i.e., in the direction in which the product moves continuously from the sheet-forming machine. A web possessing substantially uniform density, wherein the fibers are distributed substantially uniformly throughout the area of the web, can be produced at relatively high speeds by this technique.

In a web produced as just described it is difficult to measure fiber orientation directly because the individual fibers thereof are curled and bent, with various segments of the fibers extending in various directions. However, a kind of average orientation may be ascertained which is helpful in describing the physical characteristics of the web. This characteristic is called the "degree of fiber orientation." The "degree of fiber orientation" is determined by bonding the web uniformly with a material such as starch, drying the bonded web, measuring tensile strengths lengthwise and crosswise of the resulting fabric, and then computing the percentage of lengthwise or long strength of the fabric to its total strength. Total strength, for this purpose, is the sum of the tensile strengths in the long and cross directions. Thus, when long and cross tensile strengths are equal, the degree of "fiber orientation" is 50 percent.

Something more can be said generally about the positions in which the various fibers lie in the plane of the web. In a web wherein most of the fibers are substantially parallelized along the longitudinal axis of the web, the average angle between that axis and the individual fibers of the web is substantially zero. When an individual fiber is reoriented by the method of this invention to be described below, it is generally moved into a new position in which the angle it makes with the longitudinal axis of the web is increased. Thus the combined effect of the movement of all the fibers that are reoriented in the web is to increase the average angle between the longitudinal axis of the rearranged web and all the various fibers contained in the web. The frictional resistance between the individual fibers of any unbonded web to be processed in the machine of this invention is preferably low enough to permit rearrangement of the fibers in this way in the plane of the web without rupture of the web structure.

The bonding operation by which an oriented web is customarily converted into a fabric may be accomplished in one of several different ways. For example, one method is to impregnate the web over its entire width with various well-known bonding agents such as natural or synthetic resins. Another method is to print nonwoven webs with continuous straight or wavy lines of binder extending transversely or obliquely across the web. Still another method is to imprint on the web a discontinuous binder pattern, consisting of discrete, physically separate areas of binder, arranged in a staggered pattern.

Regardless of the bonding method used in producing a fabric directly from a web of oriented textile fibers, fabrics so formed have been subject to a major disadvantage: The starting web, and thus also the resulting fabric, are "non-isotropic" in respect to their physical properties. In particular, the tensile strength of the resulting fabric transverse to the direction of fiber orientation (its "cross strength"), is very much less than the tensile strength of the fabric in a direction parallel to the fiber orientation (its "long strength"). As a result, oriented nonwoven fabrics heretofore have been characteristically weak in the cross direction, tending to rip or tear when the web is subjected to even a moderate cross extensional stress.

Various techniques have been proposed for forming webs wherein the fiber orientation is more or less random. These webs may be bonded to form "isotropic" nonwoven fabrics wherein the long and cross strengths are approximately equal. Conventionally, the fibers are dispersed in an air stream which is flowed through a continuously moving foraminous collecting member which in turn separates and removes the fibers from the stream. The fibers are deposited on the collecting member in the form of a web or layer which may be removed therefrom for bonding purposes.

Since, in air-laying, positive mechanical control of the fibers is not maintained during the time they are being carried in a stream or projected to the collecting member, considerable difficulty has been experienced in attempting to obtain a web having a uniform fiber distribution. This is particularly true of light-weight webs wherein lack of uniformity will result in serious local weaknesses and even holes. While attention has been given to this difficulty in connection with the methods and apparatus disclosed in Plummer et al. United States Patents 2,676,363 and 2,676,364, the basic problem of controlling web uniformity is inherent in air deposition systems, particularly at normal economical production speeds for fabrics of this type.

In accordance with the present invention, an unbonded web having a substantially uniform density throughout the area thereof formed of loosely associated textile fibers, such as a carded web made from a multiplicity of superposed conventional card webs, which carded web weighs from approximately 100 to 5000 grains per square yard, in which the fibers are predominantly parallelized or oriented in the long direction, is subjected to a combined cross-stretching and longitudinal shrinking operation to move the originally parallelized fibers into a reoriented arrangement with the average angle between individual fibers and the longitudinal axis of the web increased.

The cross-stretching is effected in a direction substantially normal to the original direction of fiber orientation while the shrinking is effected in the said original direction of fiber orientation, i.e., the length of the web. This operation results in a deformation of the web in the plane thereof, increasing its dimensions transverse to the direction of the originally parallelized fibers and decreasing its dimensions in the long dimension.

During this web deformation, the fibers in the web are moved into reoriented positions, but in their new positions they still remain individually intermingled, overlapping and crossing other individual fibers in the web in frictional and mechanical engagement therewith.

The reoriented web formed by the combined cross-stretching and long-shrinking operation of the present invention, and then bonded to form the reoriented, nonwoven fabric of the present invention, brings about in the said fabric an increase in the strength of the fabric in the cross direction (the width), i.e., transverse to the direction of the originally parallelized fibers in the web. In other words, the reoriented web has the potential of being converted by bonding into a nonwoven fabric having an increased tensile strength in the cross direction as compared to the oriented nonwoven fabrics of the prior art.

The term "potential" tensile strength as applied to a web in the following description refers to the tensile strength of the fabric formed by bonding the fibers of a web into a unitary structure. The cross strength of the fabric is increased to the extent that the originally parallelized fibers in the web are moved or oriented away from the parallel.

In the reoriented web the density is substantially uniform throughout the area thereof regardless of the thickness of the web or the speed at which it is produced. The preferred reoriented web is one wherein the average angle between individual fibers and the longitudinal axis of the web is increased to the point where the "degree of fiber orientation" is reduced to approximately 50 percent. A web approaching this preferred form in structure is capable when bonded of providing a long-to-cross tensile strength ratio of approximately one. This preferred web may be called a "pseudo-isotropic" web, because its potential tensile strength is of the same general order of magnitude in all directions, being in fact substantially equal when measured along the two major axes at 90° to each other, i.e., the longitudinal and transverse axes of the web. Thus, the rearranged fiber web acts very much like a true "isotropic" web, and may for this reason be referred to as a "pseudo-isotropic" web.

As the fibers of the original oriented web are reoriented to reduce the "degree of fiber orientation," the increased width of the web tends to be more or less compensated for by the accompanying long shrinking thereof, with the result that the reoriented pseudo-isotropic web may have an area substantially the same as the area of the starting conventional card web. In the preferred form of the invention, the amount of long-shrinking is controlled so as to compensate as nearly as possible for the cross stretching, so as to keep the web area and web density substantially constant.

In accordance with the present invention and in its preferred form, the machine comprises a pair of overlying continuously traveling belts comprising transversely disposed extensible belt elements evenly spaced along the belts and stretchable in a direction transverse to the belt travel. Each of these belts is driven in a manner to cause the belt elements of the respective belts to move from a position of intermeshing relationship to a position of lesser or substantially no intermeshing relationship while the belt elements are being continuously and progressively stretched. The terms "intermeshing" and "intermeshed" belt elements, as used throughout the specification and claims, shall be understood to refer to two or more adjacent belt elements displaced from each other in a direction perpendicular to the median plane of the web. In the operation of the machine a fibrous nonwoven web is preferably saturated with water and is fed between the intermeshing belt elements and thereby simultaneously and progressively cross-stretched and longitudinally shrunk as it is carried by the belt elements through the machine.

In the preferred machine each extensible belt element comprises a coil spring encased in a sheath of stretchable material, preferably rubber tubing. However, any extensible and retractable belt elements, such as spaced rubber strips, may be used to make up the endless belts.

In particular, in the cross stretching machine of the invention, the web is fed into the machine by a "wet-out" device comprising a pair of feed rollers, one of which is partially immersed in a water trough, and the web is thus saturated. It has been found that a saturation of about 200 percent to 300 percent with water provides very satisfactory results. The web may be wet with more or less water, as desired. An idler roll above the feed rollers holds the portion of the web forwardly of the nip of the feed rollers against the periphery of the upper feed roller to keep water away from the portion of the web in front of the nip of the feed rollers. The positioning of the idler roll prevents washback of water from the nip of the rolls from rolling down the web and fraying it. The saturated web adheres to the rubber in which the coil springs are encased, by frictional engagement and by cohering and other forces brought about presumably by the surface tension of the water and by the tension in the web. The tension in the web is obtained by holding the saturated web against the cylindrical surface of the rubber-encased springs while the rubber is undergoing extension in a direction normal to the original direction of orientation of the fibers of the web.

The water apparently acts also as a lubricant to facilitate movement of the fibers within the saturated web. The stretching of the rubber tubing, or other laterally extensible material, transversely of the original fiber orientation of the web adhering thereto, causes the originally parallelized fibers of the web to gradually move angularly towards right angle relationship relative to their original direction. The extent to which the fibers are rearranged depends upon the amount of cross stretching to which the web is subjected.

The stretching operation may be stopped at a point at which the average angle of the fibers relative to the longitudinal axis of the web is increased to the point where the "degree of fiber orientation" is reduced to approximately 50 percent. This directional rearrangement or reorientation of the fibers increases very substantially the cross strength of a fabric made by bonding the web without any comparable decrease in the long strength of the fabric.

At the feed or entrance end of the machine the web enters between the endless belts where the belt elements move into meshing relationship and the web is thereby "corrugated" transversely at the start of the stretching operation to allow for subsequent longitudinal shrinkage as the web is stretched transversely. The extent of meshing of the belt elements decreases as the endless belts approach the exit end of the machine so that the longitudinal shrinkage of the web is generally proportional to the transverse stretch. This relationship may be adjusted to enable the surface area of the web sections between adjacent belt elements in either endless belt to remain approximately constant throughout the travel of the web in the cross stretching machine, if this is desired. In other words, if the surface area of the portion of the web between corresponding points on any two adjacent extensible belt elements is measured near the feed side of the machine it will be approximately the same as the area of the web between the corresponding points on any two adjacent belt elements near the discharge end. Thus, the long shrinkage of the web may be made to substantially compensate for the transverse stretch and the unit web weight remains approximately constant throughout the cross-stretching and long-shrinking of the web.

Although the coil springs of the belt elements may be left bare, it is preferred to cover each of them with a sheathing of rubber or other laterally extensible material because the sheathing affords a continuous surface contact between the extensible element and the web. The continuous surface contact is advantageous in that it promotes uniform stretching throughout the area of the web.

The frictional engagement of the web with the rubber sheathing as the coil springs are stretched uniformly, by engagement with cam tracks that slope outwardly at a uniform angle towards the discharge end of the machine, causes the web to be stretched uniformly through small increments throughout the width of the web. The frictional engagement of the web with the rubber sheathing of the belt elements prevents slippage and provides complete control over the full width of the web at all times during the cross stretching period.

The structure by which the above-mentioned and other advantages of the invention are attained will be described in the following specification, taken in conjunction with the accompanying drawings, showing a preferred illustrative embodiment of the invention, in which.

Figure 8:
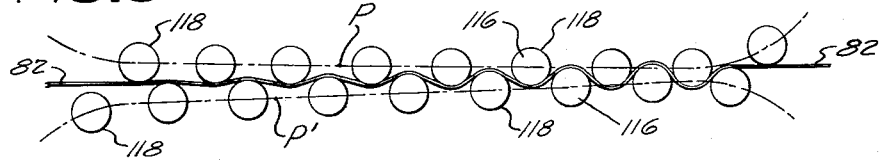
Fig. 8 is a diagrammatic view showing the intermeshing of the belt elements.
Figure 12:
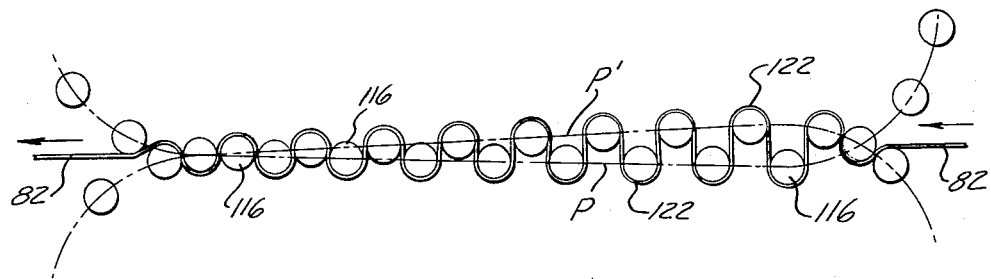
Figure 13:
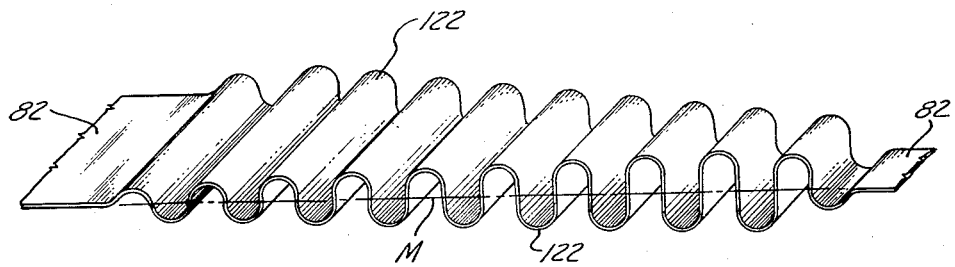

Fig. 12 is a diagrammatic view, similar to Fig. 8, showing the belt elements of the lower reach of the upper level mechanism in a plane which intersects the plane of the belt elements of the upper reach of the lower level mechanism, the intermeshing of the belt elements being at a maximum near the feed end of the machine and decreasing towards the discharge end thereof; and Fig. 13 is a detail perspective view of the web in the position of Fig. 12, the belt elements being omitted to show the transverse corrugations of the web.

Figure 1:
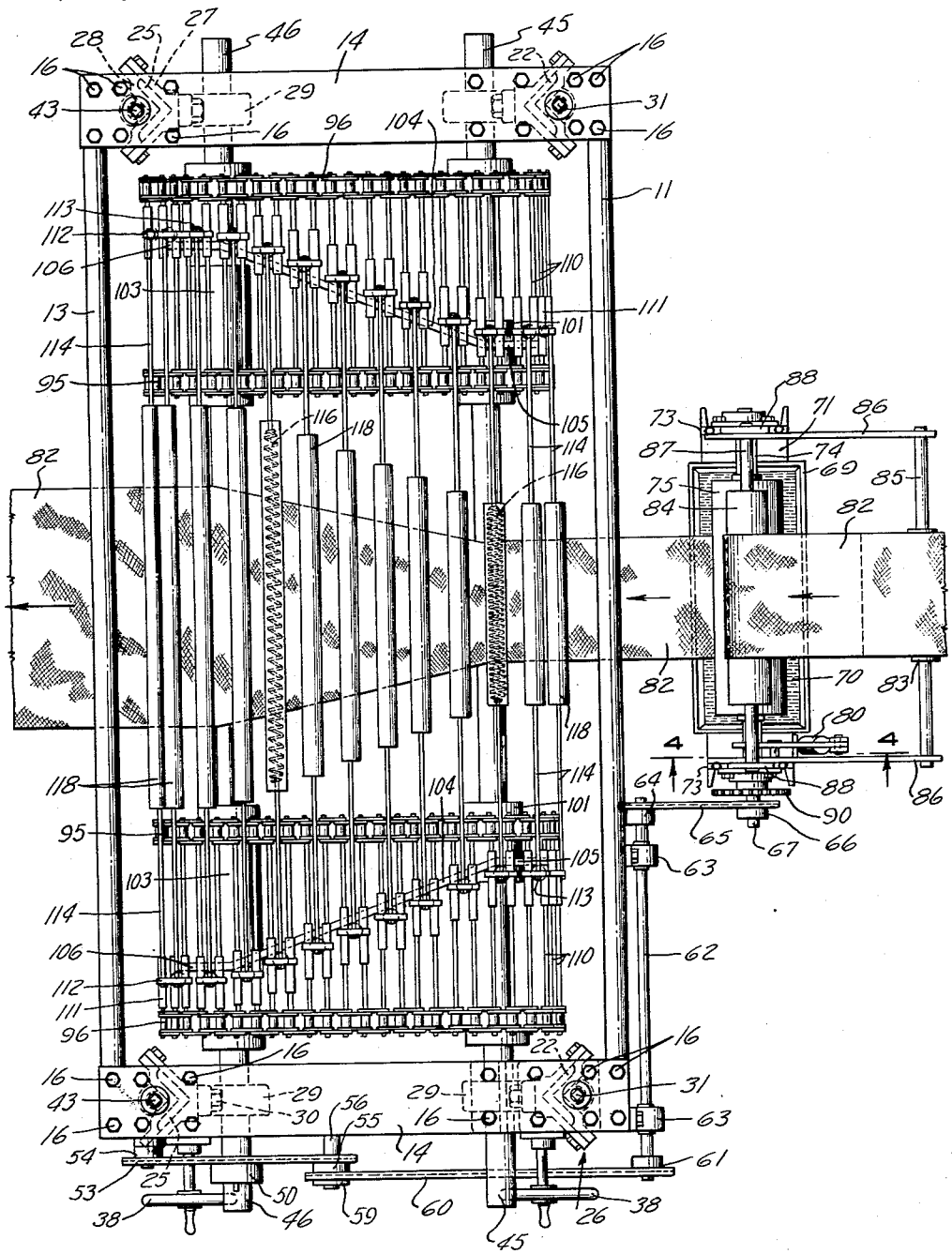
Figure 1 is a top plan view of a machine embodying the invention, with portions thereof shown in section, and with some portions omitted to clarify the illustration.
Figure 2:
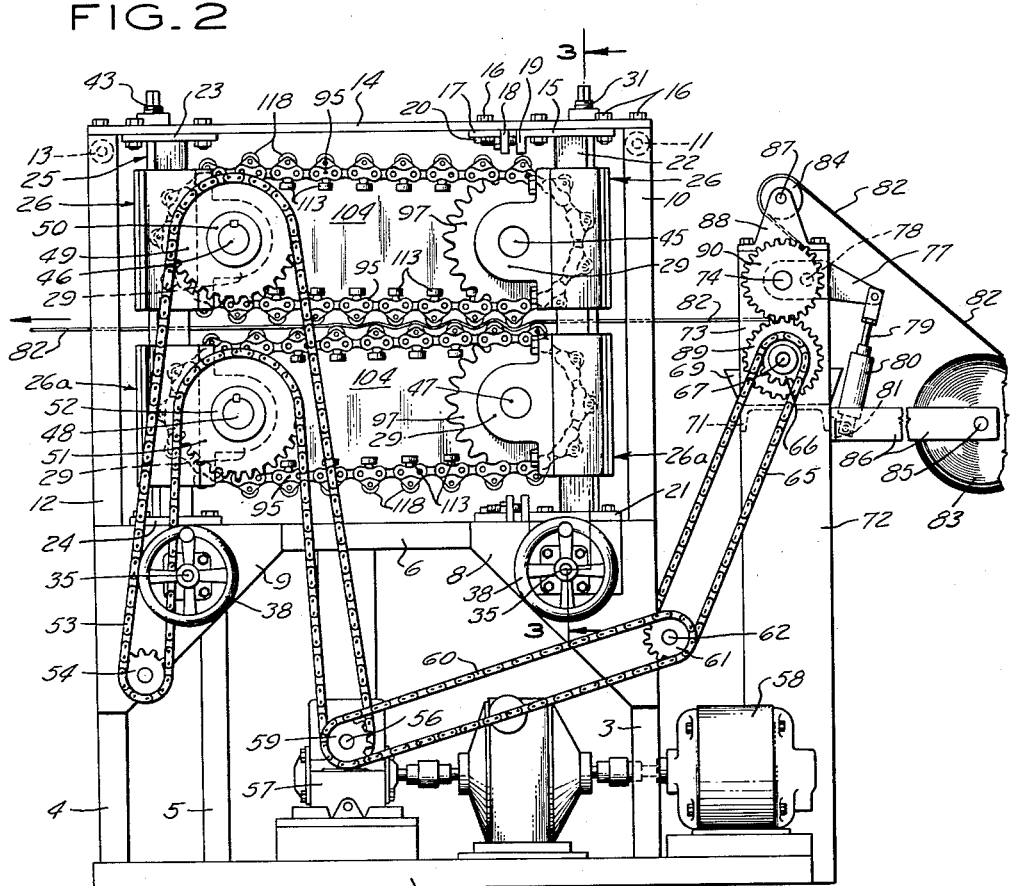
Fig. 2 is a side elevational view, showing the drive mechanism of the machine.
Figure 3:
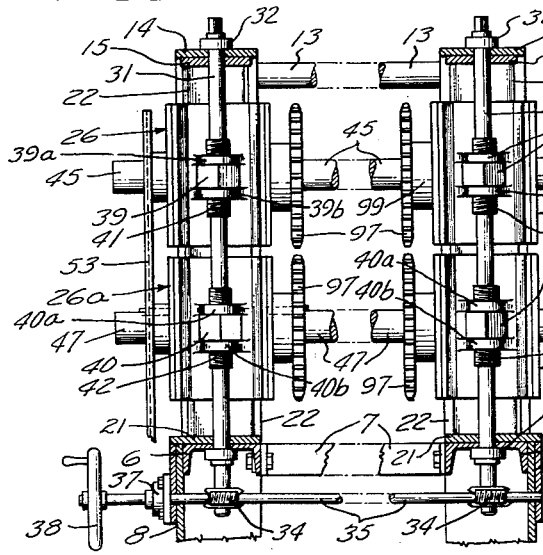
Fig. 3 is a fragmentary cross sectional view, taken along the line 3—3 of Fig. 2.
Figure 4:
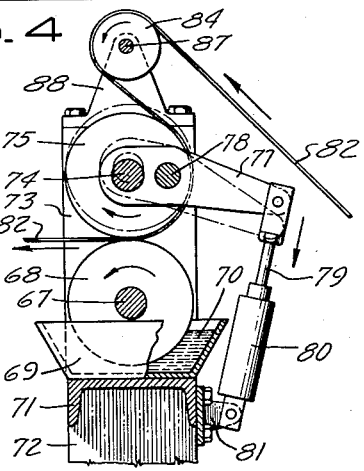
Fig. 4 is a fragmentary cross sectional view, taken along the line 4—4 of Fig. 1.

Referring to Figs. 1, 2, and 3 of the drawings, the frame of the machine comprises a base plate 2 having an upstanding angle iron 3 at each side of the front or feed end of the machine, and similar angle irons 4 at each side of the rear or discharge end of the machine. An angle iron 5, similar to angle irons 3 and 4, extends upwardly from base 2 a short distance forwardly of each angle iron 4. Longitudinal frame members 6 extend between angle irons 3 and 4 at each side of the frame. Frame members 6 are preferably channel irons but may be of any suitable shape. Transverse frame members 7 are secured to channel members 6 at each end thereof to provide a rigid rectangular supporting structure.

Triangular corner plates 8 reinforce the joints between angle iron 3 and channel members 6 at each side of the front portion of the frame, and similar corner plates 9 reinforce the joints between angle iron 4 and channel members 6 at each side of the rear portion of the frame. Angle irons 10 extending upwardly from each corner plate 8 have their upper ends tied together by a transverse rod 11, and angle irons 12 extending upwardly from each corner plate 9 have their upper ends tied together by a similar rod 13. A bar 14 is secured to corresponding ends of angle irons 10 and 12 at each side of the frame.

A flanged plate 15 is secured to the underside of each bar 14 adjacent its front end by bolts 16 which extend through slots (not shown) in bar 14 or plate 15 to permit a limited slidable movement of plate 15 relative to bar 14 for a purpose hereinafter disclosed. An angular bracket 17 rigidly secured to the underside of bar 14 by a bolt 16 has a flange 18 disposed parallel to a flange 19 depending from the adjacent end of plate 15. An adjusting screw 20 extends through apertures (not shown) in flanges 18 and 19 to control the sliding movement of plate 15 relative to bar 14. A flanged plate 21 is secured to the top surface of each channel 6 adjacent its front end in the same manner plates 15 are secured to bars 14.

An angle member 22 disposed vertically between channel member 6 and bar 14 at each side of the frame has its upper end secured to plate 15 and its lower end secured to plate 21. A plate 23 is secured to the underside of each bar 14 adjacent its rear end and a similar plate 24 is secured to the top of each channel member 6 adjacent its rear end. Plates 23 and 24 are similar to plates 15 and 21, except that they are not movable relative to bar 14 and channel 6. An angle member 25, similar to angle member 22, is secured between each pair of plates 23 and 24 at opposite sides of the frame. The open side of the V of each of the vertical angle members 22 faces in the opposite direction from the open side of the V of the vertical angle member 25.

Figure 5:
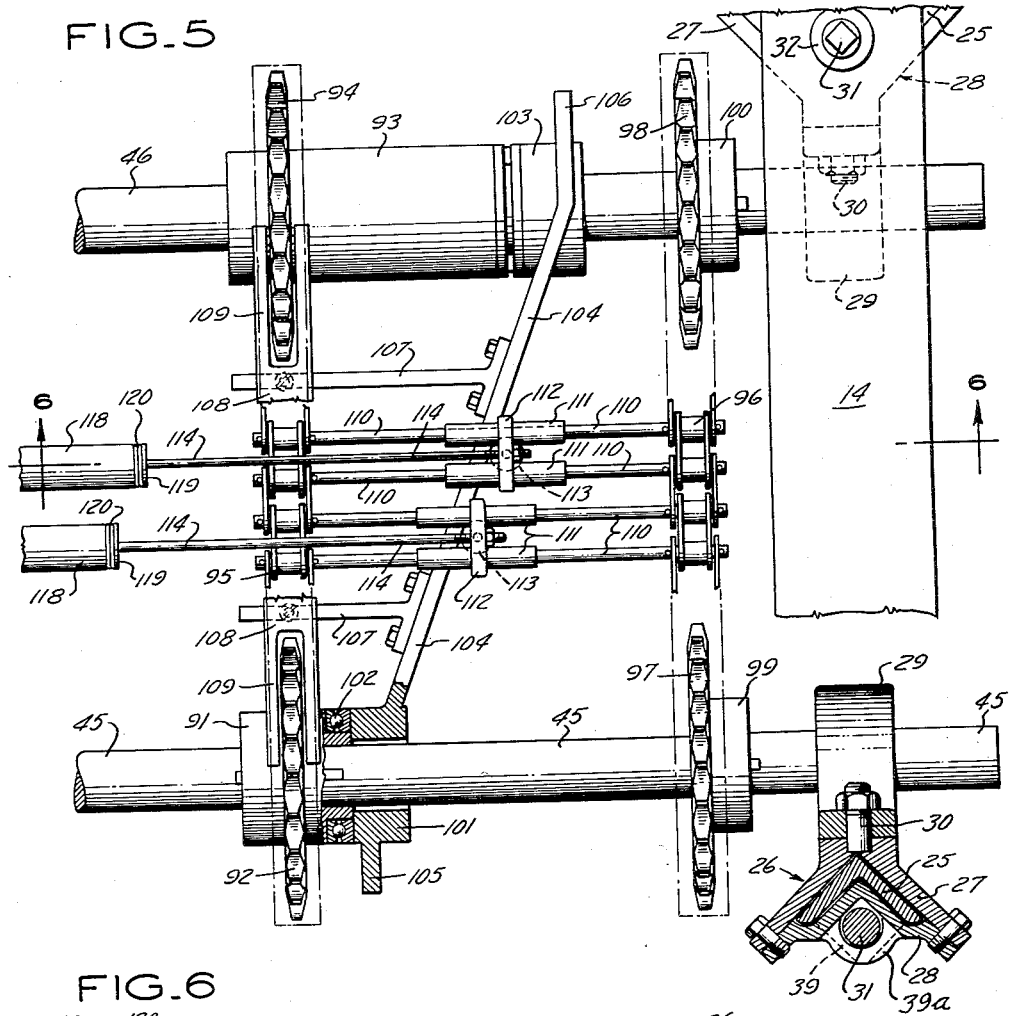
Fig. 5 is an enlarged fragmentary top plan view showing the means for holding and guiding one end of the cross stretching units.
Figure 6:
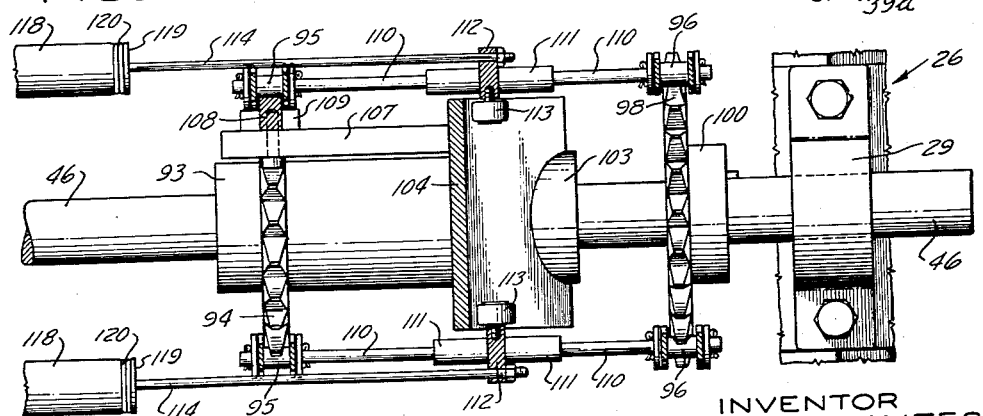
Fig. 6 is a cross sectional view, taken along the line 6—6 of Fig. 5.

Two vertically spaced sleeve members are slidably mounted on each vertical angle member 22 and 25. The upper sleeve members are designated by the reference numeral 26, and the lower ones are designated 26a. As shown in Fig. 5, each sleeve member 26 or 26a comprises a pair of V-shaped plates 27 and 28 screwed together at their outer edges. One of the plates 28 is offset to allow angle member 22 or 25 to fit in the space provided between plates 27 and 28 by the offset. A bracket 29 is secured to the back of each sleeve member 26 or 26a by means of screws 30 which extend through apertures in V-shaped plates 27 to engage the rear edge of the angle members 22 and 25.

As shown in Fig. 3, a vertical shaft 31 extends through apertures (not shown) in bar 14, plates 15 and 21, and channel member 6, adjacent the open side of the V-shaped angle of each member 22 at the front or feed end of the machine. The apertures in either plates 15 and 21 or in channel 6 and bar 14, are elongated slightly, so that if angle members 22 are moved relative to the frame, shafts 31 will be movable therewith. A collar 32, encircling the upper end of each shaft 31 and held against bar 14 in any suitable manner, cooperates with a collar 33, mounted on the lower end of each shaft and held against the underside of channel 6, to hold each shaft 31 in place.

As shown in Fig. 3, the lower end of each shaft 31 projects below collar 33 and has a worm wheel 34 rigidly secured thereto. A shaft 35 extends through corner plates 8 and is held in place by collars 36 and 37 secured to the shaft in any suitable manner. One end of shaft 35 projects beyond collar 37 and has a hand wheel 38 secured thereto. Worms are mounted on shaft 35 in engagement with worm wheels 34. In Fig. 3, the worms are located on the far side of shafts 31 and worm wheels 34, and thus are not visible in that figure. Manual rotation of wheel 38 in either direction causes both shafts 31 to rotate simultaneously in the same direction.

Each shaft 31 has a pair of nuts 39 and 40 mounted on oppositely threaded sections 41 and 42, respectively. As shown in Figs. 3 and 5, nuts 39 and 40 are held rigidly against upper and lower sleeves 26 and 26a, respectively, in any suitable manner, so that when shaft 31 is rotated in one direction, nuts 39 and 40 will not rotate with the shaft but will instead move sleeves 26 and 26a vertically towards each other. Loops 39a and 39b hold shaft 31 and nut 39 carried by that shaft against sleeve 26, while loops 40a and 40b similarly hold shaft 31 and thus nut 40 against sleeve 26a. When shaft 31 is rotated in the opposite direction, nuts 39 and 40 will move the sleeves vertically away from each other. The effects of the vertical movement of sleeves 26 and 26a will be described later.

A vertical shaft 43, similar to shaft 31 is rotatably mounted at each side of the machine adjacent the rear end thereof. Shafts 43 are rotated by a hand wheel 38 in the same manner as shafts 31. A removable hand crank can be used instead of hand wheel 38, to rotate either shaft 35, if desired.

As shown in Figs. 2 and 5, each of brackets 29 has an opening that is aligned with the opening of another bracket at the opposite end of the machine. A shaft 45 is journalled in the upper pair of brackets adjacent the front or feed end of the machine. A drive shaft 46 is journalled in the upper pair of brackets adjacent the rear end of the machine. A shaft 47, similar to shaft 45, is journalled in the lower pair of brackets at the front end of the machine, and a second drive shaft 48 is journalled in the lower pair of brackets adjacent the rear end of the machine.

Drive shaft 46 has a sprocket 49 mounted thereon adjacent one end. A collar 50 (Fig. 1) keyed to shaft 46 holds sprocket 49 in position. Drive shaft 48 (Fig. 2) has a sprocket 51 held in place by a collar 52 keyed to the shaft. Both shafts 46 and 48 are driven by an endless chain 53 which extends around the top of each sprocket 49 and 51 and is looped around an idler sprocket 54 rotatably mounted on corner plate 9, and a sprocket 55 mounted on the shaft 56 of a reducing gear 57 driven by a suitable motor 58. The travel of chain 53 over the upper edges of both sprockets 49 and 51 makes these sprockets travel in opposite directions. The motor and reducing gear housing are mounted on base 2.

Shaft 56 also drives another sprocket 59 mounted thereon. As shown in Figs. 1 and 2, an endless chain 60 extends around sprocket 59 and another sprocket 61 mounted on one end of a shaft 62. Shaft 62 is supported in bearings 63 mounted on the front or feed end of the machine. A sprocket 64 mounted on the other end of shaft 62 has an endless chain 65 extending around it. Chain 65 drives the feeding mechanism by means of a sprocket 66 mounted on a shaft 67 which carries the lower roll 68 of the "wet-out" device.

Roll 68 is partially immersed in a pan or trough 69 containing water 70. The pan is supported on a transverse channel member 71 which is in turn supported on a pair of upright standards 72 spaced forwardly of the machine. Shaft 67 is rotatably mounted in a pair of spaced plates 73 extending upwardly from opposite ends of channel member 71. Plates 73 also support a shaft 74 which carries an upper roll 75. The apertures in plates 73 for shaft 74 are slightly elongated to permit slight vertical movement of roll 75 relative to roll 68.

An arm 77 pivoted intermediate its length to a stud 78 projecting inwardly from one plate 73 also has an aperture fitting around shaft 74. Arm 77 is connected at one end to a piston rod 79 extending from one end of an air cylinder 80 which is pivotally supported on a standard 72, as indicated at 81. The air cylinder regulates the pressure of roll 75 relative to roll 68 to provide the desired moisture content for the web 82 as it is fed through the nip between rolls 68 and 75 to the web stretching mechanism. The air cylinder 80 and the associated mechanism are duplicated at the opposite end of shaft 74, although omitted from Fig. 1 for purpose of clarity. Roll 68 constantly picks up water on its peripheral surface as it rotates through pan 69 and applies it to the web to keep the web saturated to about 200 percent to 300 percent. Roll 75 presses the fibrous nonwoven web at the nip of rolls 68 and 75 to squeeze any excess moisture from the web as it passes between the rolls.

Web 82 is fed from a supply roll 83 over an idler roll 84 before it passes between rolls 68 and 75. Supply roll 83 is mounted on a rod 85 supported in arms 86 extending forwardly from standards 72. Roll 83 is preferably rotatable on rod 85, but, if desired, the rod 85 may be rotatably mounted in arms 86. Idler roll 84 is similarly mounted on a rod 87 supported at its ends by ears 88 extending upwardly from each plate 73. A gear 89, mounted on shaft 67, meshes with a gear 90 mounted on shaft 74 to rotate roll 75 simultaneously with the rotation of roll 68. The positive drive on both rolls 68 and 75 rotates them in opposite directions so as to pull web 82 from the supply roll, around the idler roll and between rolls 68 and 75 in the desired saturated condition. Idler roll 84 is positioned above roll 75 to hold the portion of web 82 being fed to rolls 68 and 75 up against the forward portion of the periphery of roll 75. This arrangement tends to keep water away from the portion of the web forwardly of the nip of the feed rollers, and facilitates feeding the web without tearing.

As shown best in Fig. 5, a hub 91 is keyed to shaft 45 adjacent one end thereof. A sprocket 92 is rigidly mounted in hub 91 to rotate therewith. A similar hub 93 and sprocket 94 are secured to shaft 46 in the same manner, with both sprockets arranged in the same plane. An endless chain 95 extends around sprockets 92 and 94 to rotate shaft 45 as shaft 46 is rotated by endless chain 53. Another endless chain 96 extends around sprockets 97 and 98 which are mounted on shafts 45 and 46, respectively, in longitudinally spaced relationship to sprockets 92 and 94. Collars 99 and 100, keyed respectively to shafts 45 and 46, retain sprockets 97 and 98 in place.

A hub 101 is loosely mounted on shaft 45 and a thrust bearing 102 is interposed between hubs 91 and 101. A hub 103 is similarly mounted on shaft 46 adjacent hub 93. It will be noted that hub 93 is considerably longer than hub 91 so that hub 103 is displaced laterally from hub 101. A vertically disposed cam track 104 extends between hubs 101 and 103. The upper edge of cam track 104 lies in the plane of the upper reach of endless chains 95 and 96, and its lower edge lies in the plane of the lower reach of these same chains. The cam track extends in a diagonal direction from a point in the vertical plane through the longitudinal center of shaft 45 to a corresponding point of shaft 46. The cam track follows around the outer section of each hub 101 and 103 in the form of a flange 105, 106, respectively, extending laterally from each of the hubs. Flanges 105 and 106 are each parallel to the plane in which sprockets 92 and 94 rotate. Hubs 101 and 103 may be made adjustable laterally relative to each other so that the angularity of cam track 104 may be adjustable, if it is desired to vary the amount of stretch to which a web is subjected in passing through the cross stretching machine.

The intermediate portion of cam track 104 has a pair of brackets 107 bolted thereto and extending towards chain 95 at right angles to said chain. A support plate 108 extending between shafts 45 and 46 is secured to brackets 107 so as to lie in a horizontal plane immediately below the lower surface of the upper reach of chain 95. The ends of support plate 108 are bifurcated, as indicated at 109, to fit around the sides of sprockets 92 and 94. The plate 108 supports the upper reach of chain 95 to prevent sagging.

Each link of chain 95 is connected a corresponding link of chain 96 by means of a rod 110. The rods may be retained in position against axial displacement by any suitable means, such as cotter pins at each end. A sleeve 111 is slidably mounted on each rod 110, and each pair of adjacent sleeves are tied together by a yoke 112, extending at right angles to the sleeves. Each yoke 112 has a pair of apertures (not shown) in each of which a sleeve 111 is fixed. Each yoke is held against movement axially of the sleeves to which it is secured so that the pair of sleeves will move axially with movement of the yoke 112 in that direction.

A roller 113 is rotatably mounted in each yoke 112. Each roller 113 is mounted to rotate in a horizontal plane, and is positioned to engage either the upper or lower edge of cam track 104, depending on whether it is in the upper or lower reach of chains 95 and 96. As the rods 110 move with chains 95 and 96 around the sprockets on which the chains are mounted, each roller 113 moves progressively in a diagonal line between hubs 101 and 103 in each reach of the chains, and follows either flange 105 and 106 in a vertical plane as it moves from one reach of the chains to the other. Since each roller 113 is mounted in a yoke 112, each yoke 112 moves in a closed path along the lower edge of cam track 104 from hub 101 to hub 103, upwardly along flange 106 from the lower reach of chains 95 and 96 to the upper reach of the chains, then along the upper edge of cam track 104 from hub 103 to hub 101, and finally downwardly along flange 105 from the upper reach of chains 95 and 96 to the lower reach of the chains.

Figure 9:
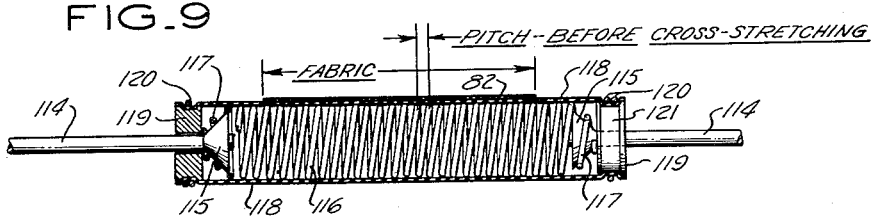
Fig. 9 is a cross sectional view, taken along the line 9—9 of Fig. 7, showing a spring belt element in retracted condition at the feed end of the machine.
Figure 10:
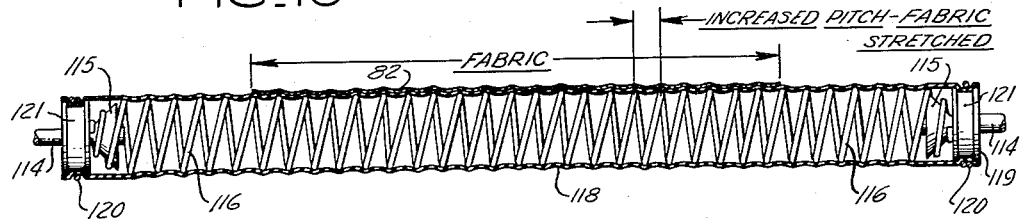
Fig. 10 is a cross sectional view, taken along line 10—10 of Fig. 7, showing the spring belt element in stretching condition at the discharge end of the machine.

A rod 114, extending parallel to rods 110 is secured at one end to each yoke 112. The opposite end of each rod 114 is provided with a cone 115, flared outwardly therefrom, as shown in Figs. 9 and 10 to facilitate securement of rods 114 to opposite ends of an extensible belt element. Each belt element includes a coil spring 116. The end coils of spring 116 are reduced in diameter, as indicated at 117, Figs. 9 and 10, to engage cone 115 so that the spring will be extended in the direction of its length when rod 114 is moved outwardly. Looking at Fig. 5, it will be seen that as each yoke 112 moves along the lower edge of cam track 104 from hub 101 to 103, the rod 114, secured to yoke 112, moves outwardly in the direction of its length. This outward movement of rod 114 stretches the spring 116 attached to it until the yoke 112 reaches flange 106, and then holds the spring in such stretched position until the yoke starts to move along the upper edge of cam track 104 from hub 103 to hub 101. During this latter movement, spring 116 contracts to hold roller 113 against the cam track.

Referring to Fig. 1, it will be seen that the structure heretofore described, comprising the chains 95 and 96 and the related mechanism, including rods 114, is duplicated at the opposite side of the machine. Identical structure will be designated by the same reference numerals. Chains 95 and 96 are rotated by shaft 46 to move yokes 112 from hub 101 to hub 103 with rollers 113 engaging the lower edge portion of cam track 104. Cam tracks 104 adjacent opposite sides of the machine diverge outwardly with equal angularity so that rods 114 are pulled outwardly at a uniform rate, thereby causing the springs 116 of the belt elements to be stretched uniformly from both ends. This uniform stretching is important because of its effect on the web 82 which is stretched simultaneously with the springs, as hereinafter described.

As shown best in Figs. 9 and 10, each belt element comprises a spring 116 encased in a tubular sheath 118 which preferably is made of rubber. Each rod 114 projects through an apertured end member 119. The opposite ends of sheath 118 are secured to end members 119 by means of wires 120 which are positioned in grooves 121 extending around the periphery of the end members.

All of the structure designated by the reference numerals 92 to 121, inclusive, is duplicated at a lower level, as indicated in Fig. 2. The same reference numerals will be used to designate identical structure. It will be noted that shafts 46 and 48 are rotated in opposite directions so that the lower reach of upper chain 95 and the upper reach of lower chain 95 move simultaneously in the same direction and at the same rate. This is essential since the web being stretched is in frictional contact with extensible belt elements connected to each of these chains.

Figure 11:
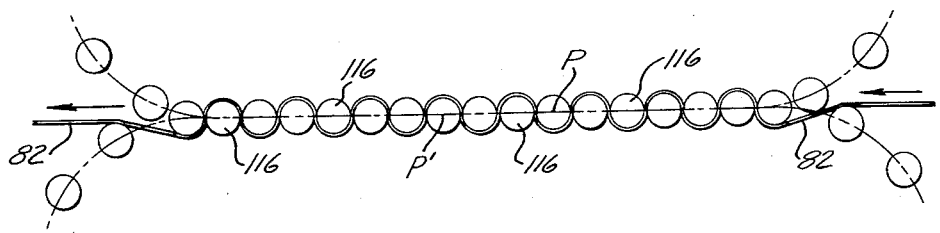
Fig. 11 is a diagrammatic view, similar to Fig. 8, showing the belt elements of the lower reach of the upper level mechanism and the belt elements of the upper reach of the lower level mechanism in a common plane.

The belt elements of the lower reach of the upper level mechanism and the belt elements of the upper reach of the lower level mechanism cooperate in engagement with a web travelling therebetween. The area in which this engagement continues, extending from the feed end of the machine to the discharge end thereof, constitutes a web stretching zone. In the embodiments shown in Figs. 2 and 8, these belt elements are intermeshed at the feed end of the machine, but the extent of the intermeshing decreases towards the discharge end of the machine so that the belt elements are spaced vertically from each other at the discharge end. In the showing of Fig. 11, the belt elements are intermeshed to the same extent at both the feed end and discharge end. In Fig. 12 the belt elements are intermeshed at the discharge end of the machine, but the extent of the intermeshing is less than at the feed end of the machine.

The web 82, saturated with water to about 200 percent to 300 percent, is fed between the extensible belt elements of the lower reach of the upper level mechanism, and the extensible belt elements of the upper reach of the lower level mechanism. As seen in Figs. 2 and 8, adjacent belt elements of the upper and lower level mechanism are intermeshed and are displaced longitudinally of the machine relative to each other. The longitudinal displacement of the belt elements is uniform throughout the machine. The intermeshing is graduated, the adjacent belt elements being intermeshed to the greatest extent at the feed end of the machine, and the extent of intermeshing being gradually decreased so that at the discharge end of the machine there is less or substantially no intermeshing. This relationship between the belt elements of the upper and lower levels is regulated by manipulation of hand wheels 38, as previously described, to maintain a predetermined intermeshing relationship dependent upon the extent to which web 82 is to be stretched in the transverse direction.

It has been found that one preferred condition for successfully stretching a saturated web is that the surface areas for an increment of web represented by the linear dimension of the web between two corresponding points on adjacent belt elements of the same series, be kept approximately uniform throughout its passage from the feed end of the machine to the discharge end. To this end the web is corrugated transversely at the feed end of the machine by meshing the belt elements of the upper and lower series, and the depth of the transverse corrugations is decreased by decreasing the intermeshing of the belt elements as the belt elements and the web frictionally adhered thereto pass towards the discharge end of the machine in accordance with the increase of width of the web. Throughout the passage of the web through the machine the quantity of fibers per unit time passing any given point thus remains substantially constant.

Another preferred condition for successfully stretching a saturated web is that the stretch be uniform throughout the area of the web. By encasing the coil springs in rubber sheaths, and positioning the saturated web in contact with the rubber sheaths, it has been found that equal pull on the ends of the springs produces a uniform stretching effect, so that the web is stretched uniformly throughout its width.

As previously mentioned, hand wheels 38 may be adjusted to provide any desired degree of intermeshing between the belt elements of the lower reach of the upper level mechanism and the belt elements of the upper reach of the lower level mechanism. If no longitudinal shrinkage of the web is required, the intermeshed belt elements may be positioned in a common plane, with the pitch lines P and P' of the belt elements of the upper and lower level mechanisms coincident, as shown in Fig. 11.

In the position of Fig. 12, the pitch lines P and P' cross each other, the belt elements of the upper reach of the lower level mechanism being positioned above the belt elements of the lower reach of the upper level mechanism adjacent the feed end of the machine. The line M, shown in Fig. 13 as extending through the corrugations 122 of a web passing between the intermeshing belt elements of Fig. 12, indicates the median plane of the web. The intermeshing belt elements are displaced relative to each other in a direction perpendicular to the median plane of the web.

The independent control of the intermeshing relationship between the belt elements at the feed end and discharge ends of the machine permits an accurate setting to provide a predetermined relationship between the cross-stretching and the long-shrinking of the web. Preferably the extent of the intermeshing is adjusted to maintain the unit of web area approximately constant throughout the travel of the web between the intermeshing belt elements. Since the distribution of the fibers is substantially uniform throughout the area of the web, the unit of web weight will also remain approximately constant.

With the pitch lines crossed, roughly as shown in Fig. 12, the change in length of a given portion of the web as it passes through the web stretching zone will occur more or less uniformly with respect to the movement of the web through that zone. Therefore, when change in width, or cross stretching, is to be effected at a substantially uniform rate, the extent of intermeshing at the inlet and outlet ends of the machine may be set, as shown in the drawings, so that change in length progressively compensates for change in width and the web area between corresponding points on any two adjacent belt elements is maintained substantially constant.

The operation of the cross-stretching machine may be summarized as follows. A fibrous nonwoven web is saturated with water, by means of a "wet-out" device, preferably to about 200 percent to 300 percent, and is then passed between and in frictional engagement with a pair of extensible belt elements at the feed end of the machine. The belt elements are intermeshed and are displaced longitudinally relative to the direction of web travel. The longitudinal displacement of the belt elements is uniform from the feed end of the machine to the discharge end thereof, but the intermeshing of the belt elements is decreased uniformly from the feed end to the discharge end of the machine. The web is corrugated transversely to a considerable extent at the feed end of the machine by the meshing of adjacent belt elements, while at the discharge end of the machine the belt elements are meshed to a lesser extent or not at all.

As each pair of extensible belt elements is moved, by chains 95 and 96, from the feed end towards the discharge end of the machine, the web is maintained in frictional engagement with the belt elements and is uniformly stretched transversely as the belt elements are stretched. The decrease in the depth of the transverse corrugations of the web is generally proportional to the increase in the transverse width of the web, so that the surface area of the web measured between two points on any two adjacent belt elements of the same series is approximately the same whether measured near the feed end or discharge end of the machine, regardless of the difference in the width of the web at these points.

In addition to the change in the width of the web, the travel of the web through the cross stretching machine also effects an important change in the orientation of the individual fibers of the web. At the feed end of the machine about 70 percent to 90 percent of the fibers are oriented in a general longitudinal direction. As the web moves through the machine the orientation of the fibers is gradually changed, and at the discharge end the fibers are arranged so that generally they are at increased angles with respect to the longitudinal axis of the web. This change in the direction of the fibers results in a very substantial increase in cross strength of the web without a correspondingly large decrease in its long strength.

Figure 7:
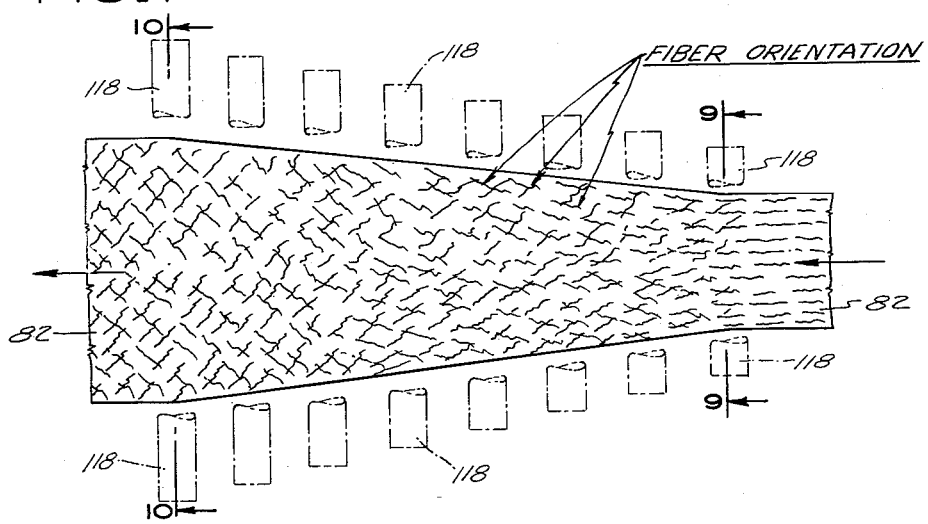
Fig. 7 is a diagrammatic view showing progressive changes in fiber orientation as the web moves from the feed end of the machine to the discharge end.

In Fig. 7 the stretching of the web is shown diagrammatically. The web is comparatively narrow as it enters between the first pair of belt elements adjacent the feed mechanism. At this point the fibers of the web are generally oriented in the longitudinal direction of the web. The web remains in frictional engagement with the rubber sheathing of the belt elements and is gradually stretched transversely as the belt elements are stretched. As the web travels to the discharge end of the machine the fibers are gradually moved towards transverse orientation. As shown in Fig. 7, the change in direction of most the fibers is consistent and uniform as the stretching process proceeds. The individual fibers do not move abruptly from a longitudinal to a transverse direction but move gradually in accordance with the extent to which the web has been stretched. The increment of width is increased gradually from that indicated as the pitch of the coils in Fig. 9, to the width indicated by the increased pitch of the coils indicated in Fig. 10. Since the transverse pull is spread evenly over the whole surface of the web, no portion of the web is subjected to strain sufficient to tear it. Although the stretching may be continued until the fibers are generally oriented more in a transverse than in a longitudinal direction, it is preferred to limit the stretching to a point where tht fibers are disposed at angles to the longitudinal axis of the web producing a "degree of fiber orientation" of 50 percent, as this arrangement provides maximum total potential tensile strength for the web.

The total amount of stretch is determined by the lateral distance between flanges 105 and 106 of the cam track. This distance may be varied, if desired, by making flanges 105 and 106 adjustable laterally relative to each other. Hubs 101 or 103 may be made laterally adjustable on their shafts to vary the amount of stretching to which the web is subjected if the cam track is made as a separate member.

While I have described a preferred embodiment of my invention in considerable detail, it will be understood that the description thereof is intended to be illustrative, rather than restrictive, as many details may be modified or changed without departing from the spirit or scope of the invention. Accordingly, I do not desire to be restricted to the exact construction described.

I claim:

1. A method of cross stretching a fibrous nonwoven web which comprises advancing a web into a web stretching zone, constraining successive portions of the web into corrugations extending transversely of the direction of travel of the web, and moving the corrugated web through the web stretching zone while gradually and progressively increasing the width of the web at each of the corrugations and simultaneously decreasing the depth of successive corrugations.

2. A cross stretching machine having a feed end and a discharge end which comprises: two separate series of belt elements, each of said belt elements being longitudinally extensible, the belt elements of one series meshing alternately with the belt elements of said other series along a portion of the length thereof in a direction of travel from the feed end to the discharge end, means for driving both of said series of belt elements in a direction normal to said extensibility from the feed end of said machine to the discharge end thereof, means for stretching end of said belt elements progressively as it is being moved towards said discharge end.

3. A cross stretching machine having a feed end and a discharge end which comprises: two separate series of belt elements, each of said belt elements comprising a longitudinally extensible spring encased in a tubular rubber sheath, the belt elements of one series meshing alternately with the belt elements of said other series along a portion of the length thereof in the direction of travel from the feed end to the discharge end, means for driving both of said series of belt elements in a direction normal to said extensibility from the feed end of said machine to the discharge end thereof, means for stretching each of said belt elements progressively as it is being moved towards said discharge end.

4. A cross stretching machine having a feed end and a discharge end which comprises: two separate series of extensible belt elements, the belt elements of one series being intermeshed with the belt elements of said other series along a portion of the length thereof in the direction of travel from the feed end to the discharge end, means for driving both of said series of belt elements in a direction normal to said extensibility from the feed end of said machine to the discharge end thereof, means for stretching each of said belt elements progressively as it is being moved towards said discharge end, and means for progressively decreasing the extent of intermeshing of said belt elements during said movement.

5. A cross stretching machine having a feed end and a discharge end which comprises: two separate series of belt elements, each of said belt elements comprising a longitudinally extensible coil spring encased in a tubular rubber sheath, the belt elements of one series being meshed with the belt elements of said other series along a portion of the length thereof in the direction of travel from the feed end to the discharge end, means for driving both of said series of belt elements in a direction normal to said extensibility from the feed end of said machine to the discharge end thereof, means for stretching each of said belt elements progressively as it is being moved towards said discharge end, and means for progressively decreasing the extent of intermeshing of said belt elements during said movement.

6. A cross stretching machine having a feed end and a discharge end which comprises: two separate series of longitudinally extensible belt elements, means for driving each of said series of belt elements in a direction normal to said extensibility through a predetermined closed path of travel extending from the feed end of said machine to the discharge end with the belt elements of both series cooperating in intermeshing relationship as they are moved from the feed end to the discharge end of the machine, means to stretch each belt element in uniform progression as it is moved in the said direction, and means to move said belt elements out of intermeshing relationship and to retract the same as they are moved in the opposite direction.

7. A cross stretching machine which comprises: two separate series of belt elements, each of said belt elements comprising a longitudinally extensible coil spring, a rod secured to each end of each of said springs, an endless chain on each side of each of said series of belt elements, means for driving said endless chains, means connecting the free end of each of said rods to one of said endless chains whereby each of said belt elements is moved through a predetermined closed path of travel with the belt elements of one series meshing with the belt elements of the other series, and means to stretch each of said belt elements at a uniform rate as it is moved in one direction.

8. A cross stretching machine having a feed end and a discharge end which comprises: two separate series of belt elements, the belt elements of one series meshing with the belt elements of said other series along a portion of the length thereof, each of said belt elements comprising a longitudinally extensible spring, a rod secured to each end of each of said springs, means for driving both of said series of belt elements from the feed end of said machine to the discharge end thereof, and a plurality of cams, each of said cams being engaged by the rods secured to the corresponding ends of one series of springs, each of said cams guiding the rods engaged thereby in an outward direction for stretching each of said belt elements progressively during its movement toward the discharge end of the machine.

9. A cross stretching machine having a feed end and a discharge end which comprises: two separate endless series of belt elements, with the upper reach of one series adjacent the lower reach of said other series, the belt elements of said upper and lower reaches of said series of belt elements being meshed adjacent the feed end of said machine and out of mesh at the discharge end, means for moving each of said series of belt elements in a predetermined closed path of travel, and means for stretching each of said belt elements progressively in the direction of its length during its movement towards the discharge end of the machine.

10. A cross stretching machine having a feed end and a discharge end which comprises: two separate endless series of belt elements, each of said belt elements comprising a longitudinally extensible spring and a separate rod secured to each end of each of said springs, the upper reach of one series of belt elements being positioned adjacent the lower reach of said other series, the belt elements of said upper and lower reaches of said series of belt elements being meshed adjacent the feed end of said machine and out of mesh at the discharge end, means for moving each of said series of belt elements in a predetermined closed path of travel, and a plurality of cams engaging said rods for stretching each of said belt elements as it is moved from said feed end towards said discharge end of the machine.

11. A cross stretching machine having a feed end and a discharge end which comprises: two separate endless chains, a series of belt elements secured to each of said chains, the belt elements of each series being meshed adjacent the feed end of said machine to transversely corrugate a web threaded therebetween, the extent of intermeshing of said belt elements decreasing towards the discharge end of the machine, means for driving said chains to move said belt elements from the feed end of said machine to the discharge end, means for stretching each of said belt elements proportionally to the decrease of said intermeshing as it is moved to the discharge end of said machine, and separate means for moving the corresponding ends of each of said endless chains vertically to vary the relative intermeshing between the belt elements of each of said series.

12. A cross stretching machine which comprises: two separate series of belt elements, in vertically spaced relationship, an endless chain connected to each of said series of belt elements, means for driving each of said endless chains to move each of said series of belt elements in a predetermined closed path of travel, means to stretch each belt element uniformly as it is moved in one direction, the belt elements of one series being meshed with the belt elements of said other series in the area in which the length of each of said belt elements is at a minimum, the extent of said meshing engagement decreasing as said belt elements are moved towards the area in which the length of each of said belt elements is at a maximum, and separate means for moving the corresponding ends of each of said endless chains vertically to vary the intermeshing between said two series of belt elements.

13. A cross stretching machine which comprises: a frame, a pair of horizontal shafts rotatably mounted in said frame adjacent opposite sides thereof, a second pair of horizontal shafts rotatably mounted in said frame below said first mentioned pair of shafts, a pair of endless chains operatively connected with said first pair of shafts adjacent opposite ends thereof, a second pair of endless chains operatively connected with said second pair of shafts adjacent opposite ends thereof, a series of extensible belt elements, a rod projecting from opposite ends of each of said belt elements, each of said rods being operatively connected to one pair of said endless chains, a second series of extensible belt elements each having a rod projecting from opposite ends thereof and operatively connected to the other pair of said endless chains, said rods being each movable along its longitudinal axis to stretch said belt elements, and cam means for controlling the movement of said rods along their longitudinal axes as said chains are moved relative to said shafts.

14. A cross stretching machine which comprises: a frame, a pair of horizontal shafts rotatably mounted in said frame adjacent opposite sides thereof, a second pair of horizontal shafts rotatably mounted in said frame below said first mentioned pair of shafts, a pair of endless chains adjacent each end of each pair of said shafts, means for driving said endless chains, rods secured at each end to two adjacent endless chains, a series of extensible belt elements positioned between two pairs of endless chains, a second series of extensible belt elements positioned between said other two pairs of endless chains, each of said series of belt elements being movable in a separate predetermined closed path of travel as said endless chains are driven, a rod projecting from each end of each of said belt elements, each of said last-mentioned rods having an outer end terminating adjacent one of said first mentioned rods, a yoke for connecting said last-mentioned rods to said first-mentioned rods, said last-mentioned rods being movable along their longitudinal axes to stretch said belt elements, and cam means engaging said yokes to regulate the movement of said last-mentioned rods along their longitudinal axes as said endless chains are driven.

15. In a machine for cross stretching fibrous nonwoven webs, a plurality of extensible belt elements positioned to receive a fibrous nonwoven web to be stretched, a rod projecting laterally from one end of each of said belt elements, each of said rods having a yoke connected thereto at its outer end, a pair of shafts substantially parallel to said belt elements, a pair of sprockets mounted on each of said shafts, a pair of endless chains connecting each of said sprockets on one shaft with sprockets on said other shaft, a plurality of rods, each of which connects one link of one endless chain to a corresponding link of said other endless chain, each of said yokes being connected to one of said second-mentioned rods, and a cam track engaging each of said yokes to guide it outwardly to stretch said belt elements as said belt elements are moved with said endless chains.

16. In a cross stretching machine, a pair of parallel endless chains, a plurality of rods connecting said endless chains together, a cam track extending angularly relative to said rods, a plurality of extensible belt elements positioned on one side of said endless chains, each of said belt elements having a rod projecting from one end thereof and a yoke secured to the outer end of each of said last mentioned rods, each of said yokes engaging said cam track to stretch said belt elements as they are moved outwardly.

17. A method of cross stretching a fibrous nonwoven web which comprises saturating an oriented fibrous nonwoven web with water, advancing the saturated web into a web stretching zone with the direction of fiber orientation in the direction of advance, constraining successive portions of the web into corrugations extending transversely of the direction of fiber orientation in the web, and moving the corrugated web through the web stretching zone while gradually and progressively increasing the width of the web at each of the corrugations and simultaneously decreasing the depth of successive corrugations.

References Cited in the file of this patent

UNITED STATES PATENTS

| | | |
|---|---|---|
| 1,902 | Tillou | Dec. 14, 1840 |
| 1,508,501 | Birch | Sept. 16, 1924 |
| 2,021,975 | Wrigley et al. | Nov. 26, 1935 |
| 2,171,551 | Hannig | Sept. 5, 1939 |
| 2,239,383 | Drewsen | Apr. 22, 1941 |
| 2,715,761 | Dougherty | Aug. 23, 1955 |
| 2,849,781 | Rosen | Sept. 2, 1958 |